United States Patent
Zhang et al.

(10) Patent No.: US 9,825,538 B2
(45) Date of Patent: Nov. 21, 2017

(54) VOLTAGE SAMPLING CONTROL METHOD AND RELATED CONTROL CIRCUIT FOR ISOLATED SWITCHING POWER SUPPLY

(71) Applicant: Silergy Semiconductor Technology (Hangzhou) LTD, Hangzhou, ZheJiang Province (CN)

(72) Inventors: Shaobin Zhang, Hangzhou (CN); Zhiliang Hu, Hangzhou (CN); Yongjiang Bai, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/294,912

(22) Filed: Oct. 17, 2016

(65) Prior Publication Data
US 2017/0133939 A1    May 11, 2017

(30) Foreign Application Priority Data
Nov. 5, 2015    (CN) .......................... 2015 1 0750636

(51) Int. Cl.
*H02M 3/335*    (2006.01)
*H02M 1/00*    (2006.01)
*H02M 1/32*    (2007.01)

(52) U.S. Cl.
CPC ... *H02M 3/33507* (2013.01); *H02M 3/33523* (2013.01); *H02M 1/32* (2013.01); *H02M 2001/0009* (2013.01); *H02M 2001/0038* (2013.01)

(58) Field of Classification Search
CPC ......... H02M 2001/0038; H02M 3/335; H02M 3/33507; H02M 3/33523; H02M 3/33553
See application file for complete search history.

(56) References Cited

U.S. PATENT DOCUMENTS

| | | | |
|---|---|---|---|
| 6,218,787 B1 | 4/2001 | Murcko et al. | |
| 8,416,587 B2 | 4/2013 | Chen | |
| 8,917,528 B2 | 12/2014 | Xu | |
| 9,131,582 B2 | 9/2015 | Chen | |
| 9,198,245 B2 | 11/2015 | Deng et al. | |
| 2005/0073862 A1* | 4/2005 | Mednik ............ | H02M 3/33523 363/20 |
| 2008/0116870 A1* | 5/2008 | Lin ................... | H02M 3/33523 323/282 |

(Continued)

*Primary Examiner* — Fred E Finch, III
(74) *Attorney, Agent, or Firm* — Michael C. Stephens, Jr.

(57) ABSTRACT

A voltage sampling control circuit can include: a bleeder circuit that generates a sampling signal by sampling a voltage across a winding of a transformer of an isolated switching power supply; a blanking time signal control circuit that activates a first blanking time signal when the sampling signal is higher than a first reference voltage, and activates a second blanking time signal when the sampling signal rises to a level of a second reference voltage, where active portions of the first and second blanking time signals overlap, and the sampling signal is not detected during activation of either of the first and second blanking time signals; a converter configured to convert the sampling signal to a detection signal after both of the first and second blanking time signals have been deactivated; and a sample and hold circuit configured to receive the detection signal, and to generate a feedback signal.

10 Claims, 4 Drawing Sheets

(56) References Cited

U.S. PATENT DOCUMENTS

| | | | |
|---|---|---|---|
| 2009/0073725 A1* | 3/2009 | Lin | H02M 3/33523 363/19 |
| 2012/0147631 A1* | 6/2012 | Nate | H02M 3/33507 363/21.15 |
| 2012/0212287 A1* | 8/2012 | Yang | H02M 1/34 327/552 |
| 2013/0057323 A1* | 3/2013 | Spini | H02M 3/33507 327/142 |
| 2013/0223108 A1* | 8/2013 | Xu | H02M 3/33507 363/21.17 |
| 2013/0250629 A1 | 9/2013 | Xu | |
| 2013/0300397 A1* | 11/2013 | Kinjo | H02M 3/24 323/358 |
| 2014/0211519 A1 | 7/2014 | Hsu et al. | |
| 2014/0268923 A1* | 9/2014 | Valley | H02M 3/33523 363/21.17 |
| 2015/0236602 A1* | 8/2015 | Ankamreddi | H02M 3/33523 363/21.18 |
| 2015/0311810 A1* | 10/2015 | Chen | H02M 3/33523 363/21.13 |
| 2016/0211755 A1* | 7/2016 | Chen | H02M 3/33507 |
| 2016/0241150 A1* | 8/2016 | Hsu | H02M 3/33523 |
| 2017/0040904 A1* | 2/2017 | Kikuchi | H02M 1/08 |
| 2017/0047854 A1* | 2/2017 | Mao | H02M 3/33546 |

\* cited by examiner

VOLTAGE SAMPLING CONTROL METHOD AND RELATED CONTROL CIRCUIT FOR ISOLATED SWITCHING POWER SUPPLY

RELATED APPLICATIONS

This application claims the benefit of Chinese Patent Application No. 201510750636.2, filed on Nov. 5, 2015, which is incorporated herein by reference in its entirety.

FIELD OF THE INVENTION

The present invention generally relates to the field of power supplies, and more particularly to voltage sampling control circuits, methods, and an associated isolated power converter.

BACKGROUND

In an isolated switching power supply with a transformer having primary and secondary windings, a voltage at one side can be sampled from the other side of the transformer based on the coupling properties between the windings of the transformer. For example, in a primary-side feedback switching power supply, an output voltage at a secondary side can be detected through a primary winding or an auxiliary winding at a primary side of a transformer, and the detected voltage signal may be fed back and controlled by a controller at the primary side. In a secondary-side feedback switching power supply, an output voltage at the primary side can be detected through a secondary winding or an auxiliary winding at the secondary side of a transformer, and the detected voltage signal can be used to achieve overvoltage protection by a controller at the secondary side. In another case, a voltage at the primary side can be detected through a secondary winding of the transformer, and the detected voltage signal can be controlled by the controller at the secondary side.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
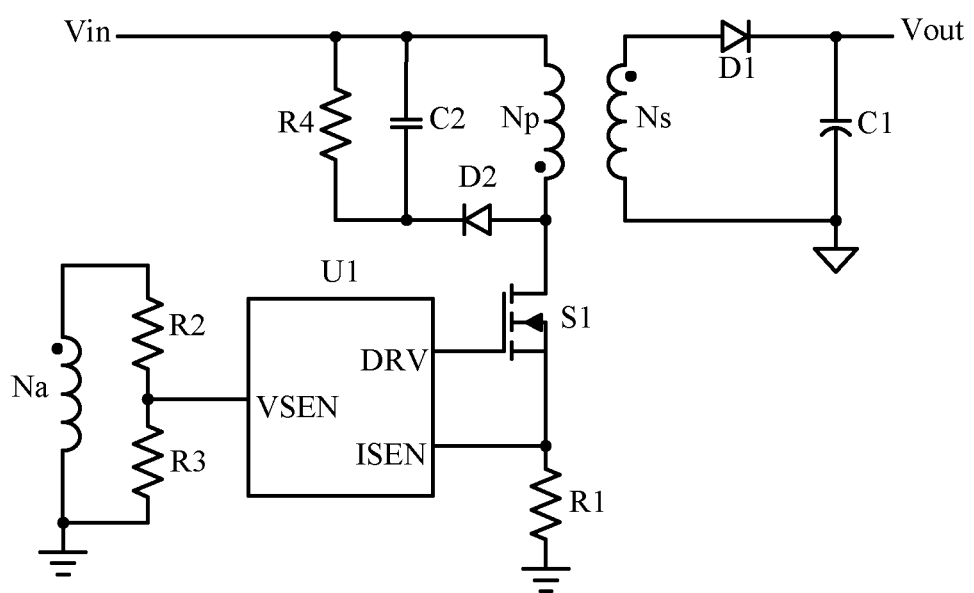
FIG. 1 is a schematic block diagram of an example isolated flyback converter which operates in a quasi-resonant mode.

Referring now to FIG. 1, shown is a schematic block diagram of an example isolated flyback converter which operates in a quasi-resonant mode. This particular example flyback converter can include a transformer having primary winding Np and secondary winding Ns, main power switch S1, auxiliary winding Na, and primary-side control circuit U1. Information about an output voltage at the secondary side can be obtained by coupling auxiliary winding Na with secondary winding Ns. For example, the output voltage can be coupled to auxiliary winding Na through secondary winding Ns, and voltage sampling signal VSEN may be obtained through a bleeder circuit that can include resistors R2 and R3. Primary-side control circuit U1 can sample a current through the main power switch by resistor R1, and may generate driving signal DRV to drive main power switch S1.

Figure 2:
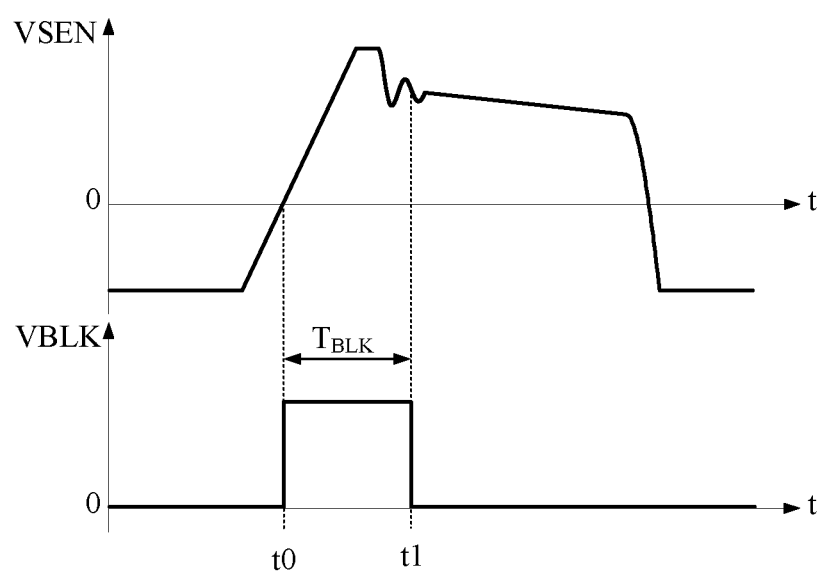
FIG. 2 is a waveform diagram of example operation of the isolated flyback converter of FIG. 1.

Referring now to FIG. 2, shown is a waveform diagram of example operation of the isolated flyback converter of FIG. 1. In FIG. 2, a voltage across the winding of the transformer and voltage VSEN may fluctuate for a time after primary-side switch S1 is turned off due to the leakage-inductance of the transformer and other parasitic parameters. Thus, interference may be imposed on voltage VSEN, which may result in inaccurate voltage information. In order to avoid such a problem, a blanking time can be set prior to sampling voltage VSEN, and voltage VSEN may not be sampled during blanking time $T_{BLK}$, in order to avoid the influence that may be caused by resonance. However, voltage VSEN may still resonate after the blanking time ends when the rise time of voltage VSEN is relatively long, which can result in abnormal circuit operation.

In one embodiment, a method can include: (i) generating a sampling signal by sampling a voltage across a winding of a transformer of an isolated switching power supply; (ii) activating a first blanking time signal when the sampling signal is higher than a first reference voltage; (iii) activating a second blanking time signal when the sampling signal rises to a level of a second reference voltage, where active portions of the first and second blanking time signals at least partially overlap, and the sampling signal is not detected during activation of either of the first and second blanking time signals; (iv) generating a detection signal from the sampling signal after both of the first and second blanking time signals have been deactivated; and (v) generating a feedback signal according to the detection signal.

In one embodiment, a voltage sampling control circuit can include: (i) a bleeder circuit configured to generate a sampling signal by sampling a voltage across a winding of a transformer of an isolated switching power supply; (ii) a blanking time signal control circuit configured to activate a first blanking time signal when the sampling signal is higher than a first reference voltage, and to activate a second blanking time signal when the sampling signal rises to a level of a second reference voltage, where active portions of the first and second blanking time signals at least partially overlap, and the sampling signal is not detected during activation of either of the first and second blanking time signals; (iii) a converter configured to convert the sampling signal to a detection signal after both of the first and second blanking time signals have been deactivated; and (iv) a sample and hold circuit configured to receive the detection signal, and to generate a feedback signal.

Figure 3:
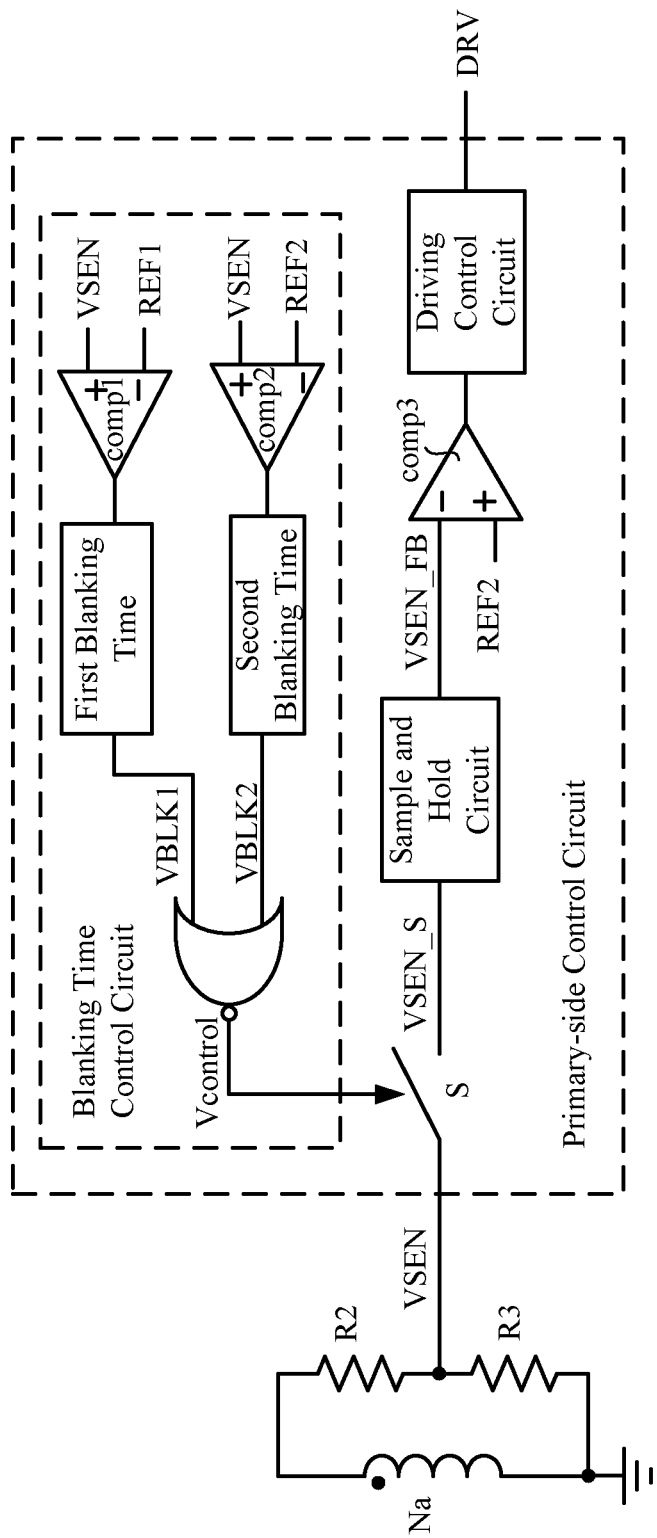
FIG. 3 is a schematic block diagram of an example voltage sampling control circuit, in accordance with embodiments of the present invention.

Referring now to FIG. 3, shown is a schematic block diagram of an example voltage sampling control circuit, in accordance with embodiments of the present invention. This particular example voltage sampling control circuit can include auxiliary winding Na, a bleeder circuit that may include resistors R2 and R3, a blanking time control circuit, and a detection circuit. Also, some parts of the voltage sampling control circuit can reside inside the primary-side control circuit. The auxiliary winding can be coupled with a transformer of the isolated switching power supply, so a voltage across the auxiliary winding may represent voltages across the primary winding and the auxiliary winding of the transformer. Also, the bleeder circuit can be used to sample the voltage across the auxiliary winding, in order to obtain sampling signal VSEN.

The blanking time control circuit can be used to generate blanking time signal VBLK1 and blanking time signal VBLK2. For example, blanking time signal VBLK1 can be activated when sampling signal VSEN is higher than zero (e.g., reference voltage REF1 is zero), and blanking time signal VBLK2 may be activated when sampling signal VSEN rises to a level of reference voltage REF1. Also, active portions of blanking time signal VBLK1 and blanking time signal VBLK2 may overlap. Sampling signal VSEN may not be detected during blanking time signals VBLK1 and VBLK2 by controlling the operation of switch S. For example, switch S can be turned off during activation of either of blanking time signal VBLK1 and blanking time signal VBLK2.

Sampling signal VSEN can be converted to detection signal VSEN_S after blanking time signal VBLK1 and blanking time signal VBLK2 are deactivated (e.g., both blanking time voltage signals are low corresponding to the end of the blanking times). A sample and hold circuit may receive detection signal VSEN_S, and can generate feedback signal VSEN_FB. Comparator comp3 may be used to compare feedback signal VSEN_FB against reference voltage REF3, and to generate driving signal DRV for the switching power supply. In this example, the winding to be detected is the auxiliary winding, but other windings (e.g., the primary winding) can alternatively be detected.

The blanking time control circuit can include comparators comp1 and comp2. Comparator comp1 can receive sampling signal VSEN and a zero reference signal (e.g., REF1) at its two input terminals, and may generate blanking time signal VBLK1. Comparator comp2 can receive sampling signal VSEN and reference voltage REF2 at its two input terminals, and may generate blanking time signal VBLK2. The blanking time can occur when blanking time signal VBLK1 or blanking time signal VBLK2 is at a high level. Here, blanking time signals VBLK1 and VBLK2 may be input to a NOR-gate, and the NOR-gate can generate control signal Vcontrol, in order to control switch S.

When blanking time signal VBLK1 and blanking time signal VBLK2 have the same pulse width, the pulse width of control signal Vcontrol may be equal to a sum of the pulse width of the blanking time and a time length that indicates sampling signal VSEN rises from zero to a level of reference voltage REF2. However, the two blanking times may not be equal. A predetermined time width may be set for calculating the blanking time, and the blanking time may be determined once the comparative result of sampling signal VSEN and the corresponding reference signal transitions.

Figure 4:
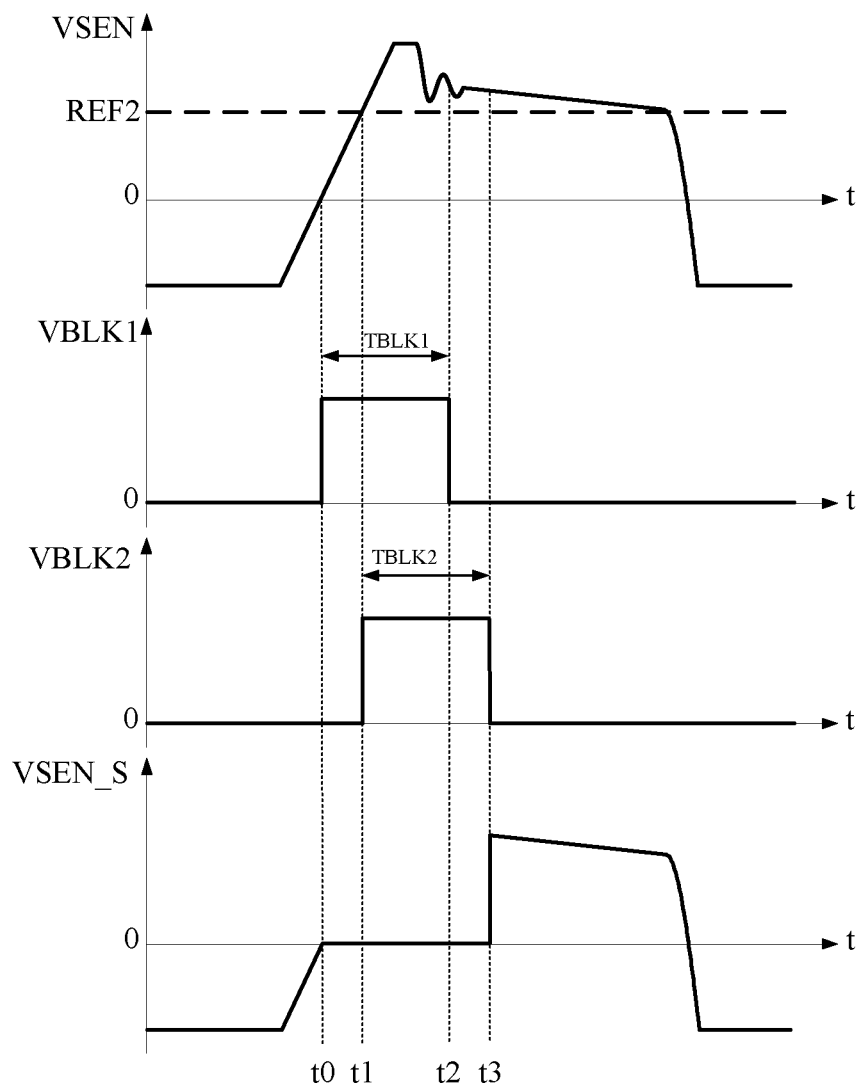
FIG. 4 is a waveform diagram of example operation of the example voltage sampling control circuit of FIG. 3, in accordance with embodiments of the present invention.

Referring now to FIG. 4, shown is a waveform diagram of example operation of the example voltage sampling control circuit of FIG. 3, in accordance with embodiments of the present invention. The example voltage sampling control circuit can provide sampling signal VSEN, blanking time signal VBLK1, blanking time signal VBLK2, detection signal VSEN S, and the relationship thereof. From FIG. 4, it can be seen that sampling signal VSEN rises relatively slowly, and the resonance period can be delayed. Blanking time signal VBLK2 may effectively shield the resonance period because blanking time signal VBLK1 may not be able to fully shield the resonance period. Thus, blanking time signal VBLK2 can be further delayed if voltage VSEN rises more slowly. The pulse widths of blanking time signal VBLK1 and blanking time signal VBLK2 may be respectively denoted by TBLK1 and TBLK2.

At time t0, sampling signal VSEN is zero and blanking time signal VBLK1 may be activated (e.g., transition from low to high). At time t1, sampling signal VSEN may rise to REF1, and blanking time signal VBLK2 can be activated. At time t2, blanking time signal VBLK1 may be deactivated, and at time t3, blanking time signal VBLK2 may be deactivated. From time t0 to time t3 corresponding to the blanking time, detection signal VSEN _S is invalid, and can begin to be consistent with (e.g., the same as) sampling signal VSEN from time t3 on whereby the sample and hold circuit operates.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method, comprising:
   a) generating a sampling signal by sampling a voltage across a winding of a transformer of an isolated switching power supply;
   b) activating a first blanking time signal when said sampling signal is higher than a first reference voltage;
   c) activating a second blanking time signal when said sampling signal rises to a level of a second reference voltage, wherein active portions of said first and second blanking time signals at least partially overlap, and said sampling signal is not detected during activation of either of said first and second blanking time signals;
   d) generating a detection signal from said sampling signal after both of said first and second blanking time signals have been deactivated; and
   e) generating a feedback signal according to said detection signal.

2. The method of claim 1, wherein said feedback signal is generated by sampling and holding said detection signal via a sample and hold circuit.

3. The method of claim 1, further comprising generating a driving signal for said isolated switching power supply by comparing said feedback signal against a third reference voltage.

4. The method of claim 1, further comprising generating, by a NOR-gate, a control signal for controlling a switch that is coupled between said sampling signal and said detection signal, wherein NOR-gate receives said first and second blanking time signals.

5. The method of claim 4, wherein said first and second blanking time signals have a same pulse width length, and a pulse width of said control signal equals a sum of said pulse width of said first and second blanking time signals and a time length of said sampling signal rising from said first reference voltage to said second reference voltage.

6. A voltage sampling control circuit, comprising:
a) a bleeder circuit configured to generate a sampling signal by sampling a voltage across a winding of a transformer of an isolated switching power supply;
b) a blanking time signal control circuit configured to activate a first blanking time signal when said sampling signal is higher than a first reference voltage, and to activate a second blanking time signal when said sampling signal rises to a level of a second reference voltage, wherein active portions of said first and second blanking time signals at least partially overlap, and said sampling signal is not detected during activation of either of said first and second blanking time signals;
c) a converter configured to convert said sampling signal to a detection signal after both of said first and second blanking time signals have been deactivated; and
d) a sample and hold circuit configured to receive said detection signal, and to generate a feedback signal.

7. The voltage sampling control circuit of claim 6, further comprising said feedback signal is compared with a third reference voltage, to generate a driving signal for said switching power supply.

8. The voltage sampling control circuit of claim 6, wherein said converter comprises a switch coupled between said sampling signal and said detection signal.

9. The voltage sampling control circuit of claim 8, further comprising a NOR-gate configured to receive said first and second blanking time signals, and to generate a control signal for controlling said switch.

10. The voltage sampling control circuit of claim 9, wherein said first and second blanking time signals have a same pulse width length, and a pulse width of said control signal equals a sum of said pulse width of said first and second blanking time signals and a time length of said sampling signal rising from said first reference voltage to said second reference voltage.

* * * * *